United States Patent [19]

Czerwinski et al.

[11] Patent Number: 4,608,418
[45] Date of Patent: Aug. 26, 1986

[54] HOT MELT COMPOSITION AND PROCESS FOR FORMING THE SAME

[75] Inventors: Richard W. Czerwinski; Larry D. Osterberger, both of Nashville, Tenn.

[73] Assignee: Gensco Inc., Tenn.

[21] Appl. No.: 704,229

[22] Filed: Feb. 22, 1985

[51] Int. Cl.[4] .......................... C08K 5/09; C08G 5/12; C08G 18/42
[52] U.S. Cl. .................................. 524/296; 524/292; 528/44; 528/80; 521/130
[58] Field of Search ..................... 528/80, 44; 524/292, 524/296

[56] References Cited

U.S. PATENT DOCUMENTS

| | | | |
|---|---|---|---|
| 2,953,489 | 9/1960 | Young | 154/139 |
| 3,437,622 | 4/1969 | Dahl | 260/24 |
| 3,686,146 | 8/1972 | Goto | 260/75 NP |
| 3,743,617 | 7/1973 | Kest | 524/296 |
| 3,813,380 | 5/1974 | Bock et al. | 260/77.5 AP |
| 3,931,077 | 1/1976 | Uchigaki et al. | 260/26 |
| 4,153,594 | 5/1979 | Wilson | 524/296 |
| 4,316,832 | 2/1982 | Walkden | 524/296 |
| 4,395,530 | 7/1983 | Hammond | 528/48 |

Primary Examiner—Herbert S. Cockeram
Attorney, Agent, or Firm—Sughrue, Mion, Zinn, Macpeak and Seas

[57] ABSTRACT

Thermoplastic hot melt compositions and process for forming such compositions are disclosed. The compositions comprise a polyurethane having at least one plasticizer reacted therein formed by heating a reaction mixture comprising at least one isocyanate having a functionality less than about 2, at least one long chain polyol, at least one chain extender and the at least one plasticizer at a temperature of at least about 330° F. where the components are present in an amount as defined in the specification. The process is adequately reflected by the above language.

38 Claims, No Drawings

HOT MELT COMPOSITION AND PROCESS FOR FORMING THE SAME

BACKGROUND OF THE INVENTION

1. Field of the Invention

The present invention relates to hot melt compositions and processes for forming the same.

2. Description of the Prior Art

Hot melt compositions and methods for forming the same as well known in the art.

The prior art as illustrated by the identified patents deal with urethane thermoplastic elastomer, molding compounds, gasketing and other areas—none of these patents nor other literature or additional prior art denotes materials having low melt viscosity, elastomeric materials with high physical properties and melt stability.

The identified patents are:

U.S. Pat. No. 3,886,182 Olstowski. The patent describes thermosetting (rapid setting or instant set), non-elastomeric plasticized urethane molding compounds with a polyol functionality of 3-8. The main purpose of the plasticizer is to make the compound readily demoldable.

U.S. Pat. No. 3,684,639 Wolfgang Keberie. The patent deals with textile sealing adhesives dealing with specific polyglycols and an aliphatic isocyanate. Differences are that it pertains to an unplasticized composition normally polymerized in solution or applied as a powder. Although the invention deals with thermoplastics, they are not hot melt materials.

U.S. Pat. No. 3,834,578 David Smith. This patent deals with liquid casting urethanes useful for foamable gaskets, but not applied as hot melt, does not contain plasticizers and the rest of the chemistry is also not similar.

U.S. Pat. No. 3,640,937 Wilhelm Thoma. The patent deals with linear elastomer fibers composed of specific dihydrazide chain extenders. The reaction is carried out in solvents and does not cover plasticizers.

U.S. Pat. No. 269,945 James A. Vanderhider. The patent deals with a foam molding compound, not a thermoplastic hot melt compound. Liquid reactants are used in the process and the final product is a solid material.

U.S. Pat. No. 4,101,439 David Russell. This patent deals with a thermoplastic composition containing no plasticizer and does not function as a hot melt material.

SUMMARY OF THE INVENTION

The present invention relates to urethane materials which function as a hot melt composition and a process for forming the same.

The hot melt compositions of the present invention are formed from a mixture of one or more polyisocyanates, one or more hydroxyl terminated polyols, one or more chain extenders and one or more plasticizers.

In accordance with the process of the present invention for forming the hot melt compositions of the present invention, components are blended, the system is heated at about 330° F. to about 450° F.

In accordance with a preferred process according to the present invention for forming the hot melt compositions of the present invention, components are blended at the lowest possible temperature, the system is permitted to exotherm and, after the peak exotherm has been reached, the system is heated at about 330° F. to about 450° F. while agitating the same to complete the reaction.

The one or more plasticizers react into the system and, based on results to date, cannot be extracted therefrom or are only partially extractable by common organic solvents at normal end use of the conditions hot melt material, e.g., hexane. gasoline, motor oil, etc.

One major object of the present invention is to provide urethane materials which function as a hot melt composition.

Another major object of the present invention is to provide such a hot melt composition which exhibits the improved properties as later described.

A further major object of the present invention is to provide a method for forming such a hot melt composition.

DESCRIPTION OF THE PREFERRED EMBODIMENTS

Per the present invention, the hot melt compositions, it has been found, must be elevated prior to or during use to a temperature of at least about 330° F. to obtain the hot melt characteristics required per the present invention.

Normally we use an initial processing temperature of at least about 330° F. where plasticizer reaction into the polyurethane is substantially completed simultaneously with achievement of the requisite temperature of about 330° F.

However, as Example 6 establishes, it is also possible to simply blend all components of the hot melt composition, permit the same to in situ cure, and then, prior to or during use, elevate the temperature thereof to at least about 330° F.

While the heating time varies greatly, without being subjected to a process cycle at a temperature of at least about 330° F., prior to or during actual end use, the hot melt characteristics required are not realized.

With respect to heating time, this varies greatly depending upon the form of the hot composition. For example, assuming a substantially completely cured thin film or layer thereof (e.g., permitted to in situ cure in place or in a container for a substantial period of time), our results indicate that heating to at least about 330° F. for a period of, for example, on the order of three minutes provides the desired hot melt characteristics. On the other hand, where a larger batch of initial reactants is involved (e.g., a 1 to 500 gallon batch), we normally heat to at least about 330° F. for at least about two hours to form the resultant hot melt composition.

In the former case, the end user will often be the individual to actually perform the step of temperature elevation to at least about 330° F., whereas in the latter case normally the initial manufacture will form the hot melt composition which need not be later heated to a temperature of at least about 330° F. (though in fact it may be so heated without harm).

Obvious variations will be apparent to one skilled in the art, e.g., rather than an extended stand at ambient temperature one could use a lesser stay at an intermediate temperature or use a catalyst, but the key factor is to elevate the hot melt composition to at least about 330° F. prior to or during use to transform the same from a "cottage cheese" like consistency to the form of a hot melt composition.

Thus, often we speak of a mandatory temperature elevation to at least about 330° F. This is correct in that if we are manufacturing an "end use ready" product for use at less than about 330° F. this temeprature must be reached prior to use. However, dependent on the form of the hot melt composition at the time of end use, e.g., thin film and the temperature of end use, initial processing can be at lower temperature. Also, if one wished to perform a temperature elevation intermediate mixing the components and end use, the temperature elevation should be to about at least 330° F. Though we do not see this as commercially desirable, this is also contemplated per the present invention.

A hot melt composition per the present invention is generally one applied in the molten state and having a viscosity in that condition (Brookfield viscometer) of less than about 50,000 cps, more preferably less than about 25,000 cps. When the hot melt composition is cooled to room temperature of course, it is a solid which is elastomeric in nature.

The urethane materials of the present invention function as a hot melt material which can be used to form, e.g., adhesives, foamed gaskets, caulks, and, we believe, pourable casting materials, tank coatings and linings and hot melt paints.

The benefits and potential benefits of the urethane materials of the present invention arise from certain basic properties thereof, with the main property of interest being the ability of these materials to flow at a comparatively low temperature of application of about 250° F. to about 450° F., i.e., the viscosities within this temperature range allow the material to be poured and potentially to be sprayed.

Other beneficial properties include high strength, adhesion to many surfaces, stability at elevated temperatures, foamability with good compression set, higher physical properties than amorphous systems since a crystallizable polymer is involved, good heat resistance up to 350° F. with some formulations, good elastomeric properties, low temperature flexibility, low energy use compared to many other adhesives, relatively fast development of strength, relatively good solvent resistance, good tear resistance, good impact resistance, relatively good oil resistance and water resistance, high abrasion resistance and good plasticizer migration resistance in a bonded part.

The urethane materials of the present invention are based on essentially stoichiometric amounts of a diisocyanate (which will insure a thermoplastic material results) having a functionality of 2.2 or less, most preferably 2.15 or less, and most preferably in the range of 2.0–2.1. If the functionality is in excess of 2.2, a thermosetting material results. With certain isocyanates having a functionality close to 2.2 a thermosetting material can also result. Such are also excluded from the present invention. The difunctional isocyanate is reactive with materials containing an active hydrogen such as hydroxyl, amine, and mercaptan group and others. These active species react with each other based upon their stoichimetry and equivalency. Basically it requires a difunctional isocyanate to be reacted with a difunctional active hydrogen (in a hydroxyl group, for example) containing material to form a polymer.

It is to be understood, in accordance with the present invention, that essentially all percentages, etc., are conventional in the art except with respect to the plasticizer which, it is our belief, we utilize in percentages much higher than are commonly utilized in the art.

As earlier indicated, the most important aspect with respect to the polyisocyanates of the present invention is the functionality thereof. Accordingly, while we prefer to use 4,4-diphenyl methane diisocyanate (MDI), the present invention is, in our belief, of broad application with respect to the polyisocyanates selected.

The polyisocyanate reactants useful in our invention are aromatic, aliphatic, cycloaliphatic or aralkyl polyisocyanates containing from about 6 to 100 carbon atoms. Although the preferred isocyanate-containing reactants contain two isocyanate groups, reactants containing more than two such groups are operative so long as the average functionality does not exceed 2.2 and the resulting urethane is thermoplastic. Blends or mixtures are also included in our general definition of diisocyanate. Isocyanate terminated prepolymers which perform as diisocyanates under the conditions encountered in the process of our invention and have an average functionality of 2.2 or less are also useful and are considered equivalent to the diisocyanates in our invention.

The following, among other polyisocyanates, are expected to be useful:
toluene-2,4-diisocyanate;
3-phenyl-2-ethylenediisocyanate;
1,5-naphthalene diisocyanate;
cumene-2,4-diisocyanate;
4-methyoxy-1,3-phenylene diisocyante;
4-chloro-1,3-phenylenediisocyanate;
4-bromo-1,3-phenylene diisocyanate;
4-ethyloxy-1,3-phenylenediisocyanate;
2,4'-diisocyanatodiphenyl ether;
5,6-dimethyl-1,3-phenylenediisocyanate;
2,4-dimethyl-1,3-phenylenediisocyanate;
4,4'-diisocyanatodiphenyl ether;
benzidinediisocyanate;
4,6-dimethyl-1,3-phenylenediisocyanate;
9,10-anthracenediisocyanate;
4,4'-diisocyanatodibenzyl;
3,3'-dimethyl-4,4'-diisocyanatodiphenylmethane;
2,6-dimethyl-4,4'-diisocyanatodiphenyl;
2,4-diisocyanatostilbene;
3,3'-dimethyl-4,4'-diisocyanatodiphenyl;
3,3'-dimethoxy-4,4'-diisocyanatodiphenyl;
1,4-anthracenediisocyanate;
2,5-fluoroenediisocyanate;
1,5-naphthalenediisocyanate;
1,3-phenylenediisocyanate;
methylene-bis(4-phenylisocyanate);
2,6-diisocyanatobenzylfuran;
bis(2-isocyanatoethyl)fumarate;
bis(2-isocyanatoethyl)carbonate; and
bis(2-isocyanatoethyl)-4-cyclohexene-1,2-dicarboxylate.

Representative monomeric aliphatic polyisocyanates which should be useful in the present invention include, among others:
1,4-tetramethylenediisocyanate;
1,6-hexamethylenediisocyanate;
1,10-decamethylenediisocyanate;
1,3-cyclohexylenediisocyanate;
4,4'-methylene-bis(cyclohexylisocyanate); and
tetramethylenexylene diisocyanate (TMXDI).

The term aliphatic polyisocyanate as used herein includes any organic polyisocyanate in which the isocyanato groups are attached to saturated carbon atoms. Cycloaliphatic polyisocyanates and polyisocyanates containing aromatic rings such as xylylene diisocyanate can be used provided they meet the limitation stated above. Representative aliphatic polyisocyanates which should be useful include 1,4-tetramethylene diisocyanate; 1,6-hexamethylene diisocyanate; 2,2,4-trimethyl-1,6-hexamethylene diisocyanate; m- and p-xylylene diisocyanate; 3-isocyanatomethyl-3,5,5-trimethylcyclohexyl isocyanate; phenylene bis(2-ethyl isocyanate); 4-methyl-1,3-cyclohexylene diisocyanate; 2-methyl-1,3-cyclohexylene diisocyanate; 4,4'-methylene bis(cyclohexyl isocyanate) and 2,4'-methylene bis(cyclohexyl isocyanate). In addition, aliphatic diisocyanates which contain ester linkages should be useful. Illustrative of such isocyanates are bis(2-isocyantoethyl)carbonate; bis(2-isocyanatoethyl)fumarate; bis(2-isocyanatoethyl)-4-cyclohexene-1,2-dicarboxylate and lower alkyl esters of 2,5-diisocyanatovaleric acid. Polyisocyanates containing three or more isocyanato groups per molecule such as 2,4-bis(4-isocyanatocyclohexylmethyl)cyclohexyl isocyanate should also be useful. These polyisocyanates can be blended or reacted providing materials applicable to the invention as long as the average functionality remains 2.2 or less and the product is thermoplastic.

Examples of commercial materials of this type are Upjohn's ISONATE ®143L ("liquid" MDI). Preferably the amount of isocyanates used is the stoichiometric amount based on all the ingredients in the formulation.

Isocyanate-terminated polyurethane prepolymers which should be useful herein may include blocked isocyanate prepolymers. For example, a polyalkylene glycol or polyalkylene ether polyester, polyacetal, polyamide, polyester polyamide or polythioether polyol may be reacted with an excess of a diisocyanate such as those mentioned above to form a suitable prepolymer with residual isocyanate groups.

The prepolymers are formed in a conventional manner and are generally produced by reactions of materials as above and diisocyanates at temperatures of from about 50° F. to about 130° F., the reaction time being matched to the predetermined temperature, for example, two hours at about 120° F.

Certain polyisocyanates useful in the present invention and those not useful in the present invention (due to too high a functionality or resulting in a thermosetting material) are set forth below.

| ISOCYANATE | FUNCTIONALITY | EQUIVALENT WEIGHT | COMMENT |
| --- | --- | --- | --- |
| Rubinate M | 2.7 | | Thermosetting |
| XI-128 | 2.1 | 135.48 | Useful, but too high a temperature required |
| XI-209 | 2.15 | 155.35 | Thermoplastic; melts about 270° C. |
| XP-744 | 2.0 | 187 | Thermoplastic |
| XI-192 | 2.2 | 153 | Thermosetting |
| LF-179 | 2.0 | 182 | Thermoplastic |
| LF-168 | 2.1 | 143 | Thermoplastic |
| Mondur PF | 2.0 | 188 | Thermoplastic |
| Mondur M | 2.0 | 125 | Thermoplastic |
| Mondur MR | 2.7 | 133.3 | Themosetting |
| MF-177 | 2.3 | 135 | Thermosetting |
| Rubinate 44 | 2.0 | 125 | Thermoplastic |

A further mandatory component, be the same in a preformed polyisocyanate or a polyurethane prepolymer, is a relatively high molecular weight substantially linear polyhydroxyl compound.

Again, the nature of this particular component of the present invention is not particularly limited.

Examples of suitable relatively high molecular weight substantially linear polyhydroxyl compounds with terminal hydroxyl groups of the formula HO—D—OH include polyesters, polyester amides, polyethers, polyacetals, polycarbonates or poly-N-alkylurethanes, other groups such as ester, ether, amide, urethane, or N-alkylurethane groups optionally being present in the above compounds. The molecular weight thereof is preferably more than 500 to 5000, most preferably from 800 to 3000 (number average). The compounds preferably have a melting point below 150° C., in particular, below 110° C. It is also possible to use mixtures of these relatively high molecular weight polyhydroxyl compounds.

The following should be particularly useful: polyesters of adipic acid and dialcohols, if desired, mixtures of dialcohols, for example ethylene glycol; propylene glycol; 1,4-butane diol; 2,5-hexane diol; 2,2-dimethyl-1,3-propane diol; 1,6-hexane diol; 2-ethyl-1,6-hexane diol, 2,2-dimethyl-1,3-hexane diol; p-bis-hydroxylmethyl cyclohexane; 3-methyl-1,4-pentane diol; 2,2-diethyl-1,3-propane diol; more preferably mixtures of these with diols or mixtures of diols containing 5 or more carbon atoms, because polyesters of this kind show a very high resistance to hydrolysis. When the diols contain branched alkyl radicals, the polyesters also show outstanding low temperature elasticity in the end products. Polyesters obtained by polymerizing caprolactones with glycols should also be suitable starting materials.

Other glycols such as hydrogenated bis-phenol A; cyclohexane dimethanol; caprolactone diol (i.e., the reaction product of caprolactone and ethylene glycol); hydroxyalkylated bisphenols; polyether glycols, e.g. poly(oxytetramethylene) glycol and the like should also be useful.

Other useful hydroxy terminated polyols should include polyesters such as polyethylene glycol adipates; polyethylene butylene adipates; the corresponding azelates for these two materials; polycaprolactones; polycarbonates; polyethers; polybutadienes or copolymers with acylonitrile, styrene, etc.; SH-terminated polyols, etc. Other various types of polyols of higher functionality should also be useful.

These diols or polyols and blends thereof should have utility in this invention if their average functionality is 2.2 or below.

A further mandatory component is a chain extending agent. While these are typically relatively low molecular weight diols, hydroxylamines, diamines, dimercaptans, and other conventional chain extending agents should also be useful.

Chain extending agents are compounds which carry, per molecule, at least two active hydrogen atoms and preferably have a molecular weight of from about 52 to less than 500, most preferably from about 62 to about 250 (number average). These compounds react with the isocyanate groups of the prepolymer and build up high molecular weight polyurethane and polyurethane ureas by linking several isocyanate prepolymer molecules.

The following compounds are examples of what we expect to be useful chain extending agents:
ethylene glycol;
propane-1:2-diol;
butane-1:4-diol;
hexane-1:6-diol;
2(3)-methylhexane-1:6-diol;
dihydroxyethylurea;
terephthalic acid-bis-(B-hydroxyethylamide);

hydroquinone-bis-hydroxyethyl ether;
naphthylene-1:5-bis-hydroxyethyl ether;
1:1-dimethyl-4-(bis-B-hydroxyethyl)-semicarbazide;
succinic acid;
adipic acid;
isophthalic acid;
1:4-cyclohexane-dicarboxylic acid;
ethylenediamine;
hexamethylenediamine;
1,4-cyclohexanediamine;
hexahydro-m-xylenediamine;
m-xylylenediamine;
p-xylylenediamine;
bis($\beta$-aminoethyl)-oxalamide;
piperazine;
2,5-dimethylpiperazine;
ethanolamine;
$\omega$-aminocaproic acid;
$\omega$-hydroxybutyric acid;
4,4-diamino-diphenylmethane;
4,4'-diaminodiphenyl-dimethylmethane;
$\omega$-amino-acetic acid hydrazide;
$\omega$-aminobutyric acid hydrazide;
$\omega$-aminocaproic acid hydrazide;
$\omega$-hydroxyacetic acid hydrazide;
$\omega$-hydroxybutryric acid hydrazide;
$\omega$-hydroxycaproic acid hydrazide;
carbodihydrazide;
hydracrylic acid dihydrazide;
adipic acid dihydrazide;
isophthalic acid dihydrazide;
m-xylylene-dicarboxylic acid dihydrazide;
ethyleneglycol-bis-carbazinic ester;
butanediol-bis-semicarbazide; and
hexamethylene-bis-semicarbazide.

In addition to the bifunctional chain extenders mentioned above, monodfunctional additives such as monofunctional amides, amines, alcohols or the like should be useful. Compounds of this type are $\epsilon$-caprolactam, dibutyl amine and neopentyl alcohol.

While not to be construed as limitative, it is most preferred that the NCO/OH ratio in the reaction system of the present invention be on the order of about 0.95 to about 1.05; at values substantially in excess of 1.05, the reaction product tends to be non-thermoplastic.

As will be appreciated by one skilled in the art, given the function of the polyol and the diol, the molecular weight of the polyol will generally be greater than that of the diol.

The amount of plasticizer used per the present invention can be defined by the range of about 0.5 to about 7.0 per the following formula:

$$(A+B+C)/D = \text{ca. 0.5 to ca. 7.0}$$

where
A = long chain polyol(s)
B = chain extender(s)
C = isocyanate(s) or prepolymer(s)
D = plasticizer(s).

Explaining the formula and illustrating the same in more detail:
A = (equivalent weight of long chain polyol(s)) × (number of moles thereof)
B = (equivalent weight of chain extender(s)) × (number of moles thereof)
C = (equivalent weight of polyisocyanate(s)) × (number of moles thereof)
D = plasticizer(s) (number of grams thereof).

EXAMPLE

A is a long chain polyol, equivalent weight is 1000, 1 mole;
B is a short chain diol, equivalent weight is 45, 6 moles used;
C is a polyisocyanate, equivalent weight is 187, 7 moles used; and
1200 grams of plasticizer are used; the above formula would calculate as follows:

$$(1000+270+1309)/1200 = 2.15$$

The result would be 2.15, well within the range defined above.

In most instances, this will mean that the plasticizer will comprise from about 15% to about 75% total composition weight, more preferably, from about 20% to 70% of the total composition weight, and most preferably from about 25% to about 65% of the total composition weight.

The most important criteria that a plasticizer per the present invention must exhibit is that it must be capable of being reacted into the polyurethane at high temperature, i.e., 330° F. or more, a temperature substantially higher than is usually encountered for urethane reactions, it must meet the range of about 0.5 to about 7.0 above and, of course, the resulting product must be a thermoplastic hot melt material, i.e., one that will flow after formation in the comparative low temperature range of 250° F. to 450° F.

It is further necessary that the plasticizer be at most only partially extractable from the final product.

Useful classes of plasticizers should include adipic acid derivatives, azelaic acid derivatives and sebacic acid derivatives such as aliphatic dicarboxylic acid esters, e.g., diisobutyl adipate, heptylnonyl adipate, bis(2-ethylhexyl) adipate, bis(2-ethylhexyl) azelate and bis(2-ethylhexyl) sebacate (DOS).

Phthalic acid derivatives, most especially phthalate esters, including dialkyl phthalates, diisoalkyl phthalates singularly or as a mixture, should also be of general application. Examples thereof include dibutyl phthalate, diethyl phthalate, butyloctyl phthalate, diisohexyl phthalate, heptylnonyl phthalate, heptylnonylundecyl phthalate (Santicizer 711), diisooctyl phthalate (DIOP), bis(2-ethylhexyl) phthalate (DOP), (n-hexyl, n-octyl, n-decyl) phthalate (DNODP-610), (n-octyl, n-decyl) phthalate (DNODP-810), isooctyl isodecyl phthalate (DIODP), diisononyl phthalate, diisodecyl phthalate (DIDP), diundecyl phthalate, ditridecyl phthalate (DTDP), butylcyclohexyl phthalate, butylbenzyl phthalate, alkylbenzyl phthalate (Santicizer 261), benzyl phthalate (Santicizer 278; 2,2,4-trimethyl-1,3-pentane diol monoisobutylated ester), bis(2-butyoxyethyl) phthalate (DBOEP), dicyclohexyl phthalate (DCHP) and diphenyl phthalate (DPP).

Glycol derivatives, most especially benzoate esters of glycols or di or other polyglycols should also have general application. Examples thereof include diethylene glycol dipelargonate, triethylene glycol bis(2-ethylbutyrate), poly(ethylene glycol)-bis(2-ethylhexanoate), methylphthalylethyl glycolate, butylphthalylbutyl glycolate, tributoxyethyl glycolate, diethylene glycol dibenzoate and glyceral tribenzoate.

Phosphoric acid derivatives, most especially phosphate esters such as triaryl phosphates and alkyl diaryl phosphates should be of general application in the present invention, for example, tributyl phosphate, tris(2-ethylhexyl) phosphate (TOF), tributoxyethyl phosphate, triphenyl phosphate ⅔ with 2-EHDPP (ratios for specific mixtures in this listing are by weight), cresyl diphenyl phosphate, tricresyl phosphate (TCP), isopropylphenyl diphenyl phosphate, t-butylphenyl diphenyl phosphate, 2-ethylhexyl diphenyl phosphate (2-EHDPP)—larger alkyl substituents such as isopropyl and t-butyl groups should also be useful—isodecyl diphenyl phosphate and chlorinated diphosphates (Phosgard 2XC-20 1/9 with DOP).

Other miscellaneous plasticizers which should be useful in the present invention include isophthalic acid derivatives such as butyl oleate 1/1 with DOP.

If desired, thermoplastic resins can be reacted with the components of the hot melt material of the present invention.

Examples of useful thermoplastic materials include novolac phenolic resins, acrylic resins, epoxy resins, amorphous block copolymers of styrene and butadiene, polyethylene terephthalate, terpene phenolic resins, substituted alkyl phenolic resins, rosin esters, polystyrene, ABS, methyl methacrylates and the like.

Typically these thermoplastic resins are dissolved in the plasticizer(s) and reacted in the system with the plasticizer(s). The maximum used would be at the solubility limit; usually such a resin(s) would be, at most, a maximum of 50 wt.% of the total composition weight It is mandatory, per the present invention, that the reaction system used to form the hot melt material be heated to a temperature of at least about 330° F. Reaction is usually completed in 2 to 2½ or 3 hours at the reaction temperature of about 330° F., most preferably at 350° F. to about 430° F. The end point of the reaction can be determined by one or more of a relatively sharp change in the viscosity, the softening point, by testing for free NCO groups, hardness or the color of the product.

We normally determine the end point of the reaction by noting a sharp change in one or more of the recited properties or by testing for the lack of free NCO groups. Thus, the time of reaction may vary from the above range. The minimum temperature is important, however, for plasticizer reaction.

A catalyst may or may not be used per the present invention. If reaction speed or temperature are overriding factors catalysts may be selected to control these factors—but catalysts are not mandatory per the invention.

Catalysts such as tertiary amines or organic tin compounds or other conventional polyurethane catalysts have been found to be appropriate. The organic tin compound may be a stannous or stannic compound, such as a stannous salt of a carboxylic acid, a trialkyltin oxide, dialkyltin oxide, a dialkyltin dihalide, a dialkyltin oxide, etc. The organic groups of the organic portion of the tin compound are usually hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin oxide, stannous octoate, stannous oleate, etc., or a mixture thereof, may be used.

Tertiary amine catalysts include trialkylamines (e.g., trimethylamine, triethylamine), heterocyclic amines, such as N-alkyl morpholines (e.g., N-methylmorpholine, N-ethylmorpholine, etc., 1,4-dimethylpiperazine, triethylenediamine, etc., and aliphatic polyamines, such as N,N,N',N'-tetramethyl-1,3-butanediamine. In addition to the aforementioned catalyst, other types of chemicals can function as catalysts for providing special properties and these are included in the term catalyst as they relate to the invention.

Usually we find less than about 1 wt.% catalyst based on the total reaction system to be adequate.

Both random copolymers (one shot) and chain extended urethanes (two step) hot melt materials can be obtained per the present invention; preferred procedures for forming the same do slightly differ and, accordingly, the procedures used in the Examples are later defined in detail.

The present invention can be practiced in a batch or continuous fashion, e.g., in a kettle reactor or in a tubular or loop reactor. The Examples illustrate batch operation.

We firstly discuss the preferred procedure for forming a random copolymer urethane hot melt material and then discuss the preferred procedure for forming a chain extended copolymer urethane hot melt material.

For purposes of brevity, in the following discussion regarding forming a random copolymer urethane hot melt material we merely refer to this as a "random copolymer".

We normally first blend together the long chain linear polyol, the chain extender and the plasticizer and, if used, any additional ingredients such as a thermoplastic resin, filler, etc. Conditions of blending are not important and any conventional blending means can be used, though if it is necessary to melt any material to obtain a solution or to insure a homogeneous system (compatibility), we prefer to accomplish this at the lowest possible temperature to avoid premature reaction until the system is well mixed. For a solid, this would be just slightly above the melting point of the solid or until the solid dissolves in the system and stays dissolved. After dissolution of solids, one can cool the system, if desired, though this is not generally necessary. For a liquid which does not dissolve in the other components, this would be the temperature at which the liquid dissolves and stays dissolved.

Having formed the basic ingredients, the polyisocyanate is then generally added slowly with agitation. There is no special criticality to the conditions used for polyisocyanate addition, but normally we prefer to use the lowest possible temperature to avoid premature reaction until the system is well mixed. Constant agitation is preferred to avoid localized pockets of materials which are not blended into a homogeneous system and, if reaction is occurring, one obviously wishes to avoid "hot spots" in the reaction system.

After a homogeneous mixture results, one then can add the optional catalyst, if desired.

The reaction is then generally permitted to proceed, the exotherm heating the reaction mass.

In line with the above approach, we normally permit the system to exotherm to the maximum temperature (peak exotherm) and then, once the maximum temperature has been reached, we begin to heat the system (any heating system can be used, as desired) to about 365° F.~390° F., maintaining constant agitation for about 2½ hours to complete the reaction. By permitting the peak exotherm to be reached we thus realize some energy (heat) savings and reduce process cost. This is not necessary for the process, however, and one could just heat after all components are blended.

A typical random copolymer made under the above conditions resulted in a copolymer showing the following properties:

Recipe:

| (a) | (b) | (c) |
|---|---|---|
| 1 | 6 | 7 |

1200 (d)

a = PCP 0240 - Equivalent Weight = 1000 × 1 = 1000 gr.
b = 1-4 Butane Diol - Equivalent Weight = 45 × 6 = 270 gr.
c = XP 744 - Equivalent Weight = 187 × 7 = 1309 gr.
d = Benzoflex 988 = 1200 gr.

Properties:
Viscosity 350° F. = 5000 cps
Softening Point = 250° F.

The procedure with respect to a chain extended urethane hot melt material (in this discussion, chain extended copolymer for brevity) is quite similar to the above, but does differ slightly.

Normally we first blend the long chain linear polyol or the chain extender with the plasticizer and optional resin, etc. Normally only one of the long chain polyol or the chain extender is initially blended. Again, we prefer to use the lowest temperature possible if it is necessary to melt a solid or dissolve a liquid. The polyol or chain extender, whichever is blended first, determines the backbone of the final chain extended copolymer and, as a consequence, the low temperature properties and chemical resistance of the chain extended copolymer and the flexibility (physical) properties of the final chain extended copolymer. The polyisocyanate is then added slowly to either the long chain polyol or the short chain diol (or other chain extender) in a manner to generate a homogeneous system. After the addition of the diisocyanate is completed, an optional catalyst may be added, and, the batch is permitted to exotherm, e.g., to about 200° F. The earlier discussion with respect to blending conditions regarding random copolymer formation apply with equal force to the chain extended copolymer formation.

Either the long chain polyol or the chain extender, whichever was not initially added, is then added preferably at a temperature lower than the final reaction temperature, whereafter the temperature is elevated to the reaction temperature. While addition at a temperature lower than the final reaction temperature is optional, it avoids loss of low boiling materials open to the atmosphere operation (e.g., chain extender) and seems to provide better molecular weight control and better batch-to-batch reproducibility. For example, we have often used temperatures less than 200° F. for this addition in combination with good agitation. The batch is then heated to 365° F.~390° F. for 2½ hours.

A chain extended copolymer made under the above conditions resulted in a copolymer having the following properties:

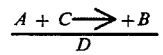

Long Chain Polyol Backbone (A)   Visc. - 2000 cps at 350° F.
| (a) | (b) | (c) |
|---|---|---|
| 1 | 6 | 7 |

Softening Point 232° F.

In the above example the long chain polyol (a) was added first then the isocyanate (c), and after an inital reaction, the chain extender added (b), or

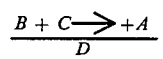

Short Chain Backbone (B)   Visc. - 17,200 cps at 350° F.
| (a) | (b) | (c) |
|---|---|---|
| 1 | 6 | 7 |

1200 (d)

Softening Point 256° F.

In a short chain backbone example as above, the additive sequence was:

$$\frac{B + C \rightarrow +A}{D}$$

a = PCP 0240 - Equivalent Weight = 1000 × 1 = 1000 gr.
b = 1,4-Butane Diol - Equivalent Weight = 45 × 6 = 270 gr.
c = XP 744 - Equivalent Weight = 187 × 7 = 1309 gr.
d = Benzoflex 988 = 1200 gr.

The components of the reaction system of the present invention can obviously be added in any order desired. In the working Examples which are later presented, the polyisocyanate is added last, however.

Obviously additives as are commonly added to polyurethane products such as antioxidants, UV stabilizers, colorants, fillers, etc., can be added to the hot melt material of the present invention in conventional amounts.

The rate of temperature increase from the peak exotherm to the actual reaction temperature (the peak exotherm will normally be substantially less than the reaction temperature) is not important and can be freely selected as desired. Normally we just raise the temperature to the reaction temperature as quickly as is convenient with the heating means used to reduce total processing time.

Having thus described in general the procedure used for the working Examples, the following non-limiting Examples which illustrate what we currently believe to be the best modes of practicing the invention are given.

In the Examples, the following abbreviations or trademark materials are used:

PCP 0200500: polycaprolactone diol; equivalent weight=ca.

PCP 02402000: polycaprolactone diol; equivalent weight=ca.

PCP 02603800: polycaprolactone diol; equivalent weight=ca.

The above are long chain linear polyols; number average molecular weight is the equivalent weight times the functionality.

T-12: dibutyl tin dilaurate (catalyst)

TMBDA: tetramethylbutanediamine (catalyst)

Benzoflex 988: diethylene glycol dibenzoate (plasticizer)

XP 744: (a modified liquid methylene diisocyanate adduct of a functionality of 2.0 and an equivalent weight of 187)

K-Flex 500 (a liquid mixture of dipropylene glycol dibenzoate (m.w.:342) and diethylene glycol dibenzoate (m.w.:314); dibenzoate ester assay:98%; plasticizer)

Morflex P51A (an adipic acid/glycol acetylated polyester; molecular weight: ca. 2,000 (number average); plasticizer)

C-206 (an organophosphene oxide diol, available from FMC)

Polymeg 2000: (polytetramethylene ether glycol; OH number=57, available from Quaker Chem.)

In the Examples the softening point was determined by the ring and ball method of ASTM E28, all equivalent ratios are given in the order polycaprolactone-1,4-butane diol-diisocyanate (values being in gram moles), with the amount of plasticizer in grams being given thereunder. Thus, e.g., in Example 1, first run, the designation (1-4-5)/1200 identifies the system PCP 0200 (1 equivalent)-1,4-butane diol (4 equivalents)-XP 744 (5 equivalents) reacted with 1200 g of diethylene glycol dibenzoate, using 20 drops of T-12 of T-12 as a catalyst, reaction being at 365° F.–390° F. for 2½ hours after the peak exotherm is reached. The softening point was 224° F. and the melt viscosity was 950 cps at 350° F. and melt viscosities were measured at 350° F. except where otherwise noted and the catalyst is identified as T-12 or TMBDA. In each Example, unless otherwise indicated, 20 drops of catalyst was used, the catalyst being added after completion of diisocyanate addition.

It will be noted in the working examples that at different equivalent ratios not all possible catalyst and long chain diol permutations were used.

For each run which was performed, however, usually the melt viscosity at 350° F. (unless otherwise noted) is given in cps and the softening point (ASTM E28) in °F. are given.

While the Examples show operation under conditions open to the atmosphere, if desired, we believe that operation could be conducted under an inert gas such as nitrogen, argon, neon, etc.

Operation in all of the following Examples was at atmospheric pressure; pressure could be used, we believe, if desired.

In all following Examples, until otherwise indicated, the random copolymer (one shot) formation procedure earlier described was used.

Example 1

| Equivalent ratio | Diol | | | | | |
|---|---|---|---|---|---|---|
| | PCP 0200 | | PCP 0240 | | PCP 0260 | |
| | T-12 | TMBDA | T-12 | TMBDA | T-12 | TMDBA |
| $\frac{1-4-5}{1200}$ | 950 cps 224° F. | | | | | |
| $\frac{1-6-7}{1200}$ | 7500 cps 250° F. | | 25,000 cps 252° F. | 15,000 cps 248° F. | | 3800 cps |
| $\frac{1-9-10}{1200}$ | | | | 7400 cps 254° F. | | |
| $\frac{1-13-14}{1200}$ | | | | 2500(*) cps 314° F. | | |
| $\frac{1-14-15}{1200}$ | | | | 1525(*) cps 294° F. | | |
| $\frac{1-19-20}{1200}$ | | | | 2500(*) cps 286° F. | | |

(*)450° F. for viscosity measurement

The above Example shows the effect of the ratio of the diols (based upon equivalent weights) and the type of catalyst used.

Example 2

$\frac{1-6-7}{X}$ - PCP 0240

| Control | A 10 % Post added | B 20% Post added | C 30% Post added | D 31.5% Additional Benzoflex Reacted |
|---|---|---|---|---|
| PCP 0240 (1000 g) | 1320 g | 1440 g total | 1560 g total | PCP 0240 (1000 g) |
| Benzoflex 988 (1200 g)* | 1320 g total | 1440 g total | 1560 g total | Benzoflex 988 (1578 g) in initial formula |
| 1,4-Butane diol (270 g) | | | | 1,4-Butane diol (270 g) |
| XP 744 (1309 g) | | | | XP 744 (1309 g) |
| T-12 (20 drops) | | | | T-12 (20 drops) |
| Visc. - 5000 cps | 2150 cps | 1000 cps | 500 cps | 14,200 cps |
| Softening Pt. 250° F. | 240° F. | 242° F. | 226° F. | 256° F. |

*The amount of Benzoflex 988 added to the total system. Note the change between the Control and D.

This Example shows the effects obtained where the plasticizer is "post added", i.e., blended into the final random copolymer as opposed to being reacted into the random copolymer as per Example 1. This is illustrated in Runs A, B and C.

The "Control" run corresponds to the second run in Example 1, i.e., the (1-6-7)/1200 run using T-12. Thus, in Runs A, B and C there was merely blended into the product 1320, 1440 and 1560 g of the Benzoflex 988 whereas the Run D a total of 1578 g of Benzoflex 988 was reacted in as opposed to 1200 g of Benzoflex 988.

It is easily seen that the plasticizer "reacted" into the polymer provides much greater physical and melt properties as compared to the "post added" material.

The procedure used to form the "post added" plasticizer material was to remelt the random copolymer after formation and then uniformly blend in the amount of plasticizer indicated in the table reflecting Example 2.

Example 3

| (A) | (B) |
|---|---|
| $\frac{1\text{-}6\text{-}7}{1200}$ | $\frac{1\text{-}6\text{-}7}{2400}$ |
| PCP 0200 (261 g) | PCP 0200 (261 g) |
| 1,4-Butane diol | 1,4-Butane diol |
| (270 g) | (270 g) |
| Benzoflex 988 | Benzoflex 988 |
| (1200 g) | (2400 g) |
| XP 744 (1309 g) | XP 744 (1309 g) |
| T-12 (20 drops) | T-12 (20 drops) |
| Visc. 7500 cps | 1200 cps |
| Soft. pt. 250° F. | 242° F. |

This Example was essentially a repeat of Example 1, second run, in Run A with the amount of Benzoflex 988 being doubled (1200 g to 2400 g) in Run B.

It is seen that there was little change in melt viscosity and softening point with a doubling of the plasticizer.

We believe this is due to the fact that per Example 1 essentially all plasticizer was "reacted" into the random copolymer whereas in Example 3 excess, i.e., that in excess of 1200 g, was not "reacted" into the random copolymer.

Example 4

$\frac{1\text{-}6\text{-}7}{1200}$

| | |
|---|---|
| PCP 0240 | 1000 g |
| 1,4-butane diol | 270 g |
| Diethyl phthalate | 1200 g |
| XP 744 | 1374 g |
| T-12 | 20 drops |
| Viscosity | 1900 cps (400° F.) |
| Softening Point | 196° F. |

Example 4 is essentially a rerun of Example 1, second run, except that the plasticizer diethyl phthalate was used instead of Benzoflex 988.

The results achieved are seen to be very similar to that of Example 1.

Duplicating the above Examples except for changing the plasticizer from diethyl phthalate to K-Flex 500 and Morflex P51A gave the following results:

| | Viscosity (400° F.) | Softening Point |
|---|---|---|
| K-Flex 500 | 350 cps | 226° F. |
| Morflex P51A | 9400 cps | 276° F. |

This Example establishes the utility of plasticizers other than diethylene glycol dibenzoate in the present invention.

Example 5

| | |
|---|---|
| C-206 (FMC) | 112 g |
| 1,4-Butane diol | 180 g |
| Benzoflex 988 | 1200 g |
| XP 744 | 935 g |
| T-12 | 20 drops |
| Viscosity | 1500 cps |
| Softening Point | 200° F. |

Example 5 is essentially a rerun of Example 1 except that a different diol, i.e., different than a polycaprolactone, was used.

This recipe for the above run using the formula earlier set forth was:

$\frac{1-4-5}{1200}$.

The above run was again duplicated except for varying as below. The viscosity and softening point values obtained are set forth:

Recipe: (1-6-7)/1200
Polymeg 2000—984 gr.
1,4-Butane diol—280 gr.
Benzoflex 988–1200 gr.
XP 744—1309 gr.
T-12—20 drops
Viscosity at 400° F.-3700 cps
Softening point—264° F.

This Example establishes that diols other than polycaprolactones can be used with success in the present invention.

Example 6

| | |
|---|---|
| PCP 0240 | 1000 g |
| 1,4-Butane diol | 270 g |
| Benzoflex 988 | 1200 g |
| XP 744 | 1309 g |
| Catalyst | None |
| Viscosity | 15,000 cps |
| Softening Point | 262° F. |

This is essentially a rerun of Example 1 except no catalyst was used.

The only variation was that the PCP 0240 was melted with the Benzoflex 988 and the 1,4-butane diol, the XP 744 was added and the system was heated at about 365° F. for 2 hours.

While no catalyst was used in the above run, heat was applied.

The above run was duplicated except varying as follows:

20 drops of TMBDA was added following polyisocyanate addition; and rather than heating, all ingredients was merely placed into a container after mixing and stirred until the reaction exotherm ceased. The container was then retained for two weeks at room temperature and then the resulting random copolymer was removed.

Surprisingly, the random copolymer had no desirable properties in the sense of the present invention until it was heated to about 330° F. for a period of 15 minutes. For example, heating at 280° F. for 15 minutes did not provide a desired hot melt composition, rather, the same resembled "cottage cheese".

The exact time of heating is not important in this embodiment, rather, what is important is to elevate to at least about 330° F. It must be noted that curing has proceeded for two weeks.

Following the above treatment, the following physical properties were determined:

Viscosity at 400° F.-5300 cps
Softening Point—278° F.

The above runs demonstrate that hot melt materials per the present invention cannot be formed without the use of heat as defined above at some point prior to or during use.

It should be noted that if the polymer is made without heat (no additional heat is supplied other than the system being permitted to exotherm), a soft unuseable product in the sense of the present invention is obtained. In distinction, if the polymer is heated after the reaction is complete at a later time and applied as a hot melt, the typical desirable physical properties of the present invention are obtained.

There are a number of additional ingredients which are also optional in the sense of the present invention. These are briefly discussed below.

Conventional fillers for use herein include, for example, aluminum silicate, calcium silicate, magnesium silicate, calcium carbonate, barium sulfate, calcium sulfate, glass fibers, carbon black and silica. The filler, if used, is normally present in an amount ranging from about 5 to 50% by weight of final resin solids.

The above listing of fillers is not, of course, in any fashion limitative.

The main purposes of using a filler would be as a reinforcing agent, to influence rheological properties, and to lower cost. It is further preferred that the fillers be free from water.

If desired, the hot melt material of the present invention can be foamed. Many alternatives will be apparent to one skilled in the art. For example, a gaseous material such as nitrogen, etc., can be introduced into the liquid hot melt while the same is under pressure and, when the pressure is removed, the gaseous material will result in a foamed hot melt material. As an alternative, a material which decomposes at the temperature of use could be added to the hot melt material after production.

While there has been described what are at present considered to be the preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A thermoplastic hot melt composition comprising a polyurethane having at least one plasticizer reacted therein formed by heating a reaction mixture comprising at least one isocyanate having a functionality less than about 2.2, at least one long chain polyol, at least one chain extender and the at least one plasticizer at a temperature of at least about 330° F., wherein said components are present in amounts sufficient to meet the following formula:

$(A+B+C)/D=0.5$ to about 7.0 wherein:
A represents the equivalent weight of the long chain polyol x the moles thereof used;
B represents the equivalent weight of the chain extender x the moles thereof used;
C represents the equivalent weight of the isocyanate x the moles thereof used; and
D represents the grams of plasticizer.

2. A process for forming a thermoplastic hot melt composition comprising a polyurethane having at least one plasticizer reacted therein formed from at least one isocyanate having a functionality less than about 2.2, at least one long chain polyol, at least one chain extender and the at least one plasticizer which comprises heating a mixture of the above-named components at a temperature of at least about 330° F., wherein said components are present in an amount to meet the following formula:

$(A+B+C)/D=0.5$ to about 7.0 wherein:
A represents the equivalent weight of the long chain polyol x the moles thereof used;
B represents the equivalent weight of the chain extender x the moles thereof used;
C represents the equivalent weight of the isocyanate x the moles thereof used; and
D represents the grams of plasticizer.

3. A thermoplastic hot melt composition comprising a polyurethane having at least one plasticizer reacted therein formed from a reaction mixture comprising at least one isocyanate having a functionality less than about 2.2, at least one long chain polyol, at least one chain extender and the at least one plasticizer by heating a mixture of the above-named components at a temperature of at least about 330° F. for at least about 2 hours, wherein said components are present in amounts sufficient to meet the following formula:

$(A+B+C)/D=0.5$ to about 7.0 wherein:
A represents the equivalent weight of the long chain polyol x the moles thereof used;
B represents the equivalent weight of the chain extender x the moles thereof used;
C represents the equivalent weight of the isocyanate x the moles thereof used; and
D represents the grams of plasticizer.

4. A process for forming a thermoplastic hot melt composition comprising a polyurethane having at least one plasticizer reacted therein formed from at least one isocyanate having a functionality less than about 2.2, at least one long chain polyol, at least one chain extnder and the at least one plasticizer which comprises heating a mixture of the above-named components at a temperature of at least about 330° F. for at least about 2 hours, wherein said components are present in an amount to meet the following formula:

$(A+B+C)/D=0.5$ to about 7.0 wherein:
A represents the equivalent weight of the long chain polyol x the moles thereof used;
B represents the equivalent weight of the chain extender x the moles thereof used;
C represents the equivalent weight of the isocyanate x the moles thereof used; and
D represents the grams of plasticizer.

5. A thermoplastic hot melt composition as claimed in claim 1, wherein said composition is substantially completely cured in situ and then is further heated for at least 3 minutes.

6. A thermoplastic hot melt composition as claimed in claim 1, wherein said heating is for at least about 2 hours.

7. A thermoplastic hot melt composition as claimed in claim 1, wherein said thermoplastic hot melt composition will exhibit a viscosity of less than about 50,000 cps at a temperature of about 250° F. to about 450° F.

8. A thermoplastic hot melt composition as claimed in claim 1, wherein said thermoplastic hot melt composition will exhibit a viscosity of less than about 25,000 cps at a temperature of about 250° F. to about 450° F.

9. A thermoplastic hot melt composition as claimed in claim 1, wherein said polyisocyanate has a functionality of 2.15 or less.

10. A thermoplastic hot melt composition as claimed in claim 1, wherein said polyisocyanate has a functionality of 2.0-2.1.

11. A thermoplastic hot melt composition as claimed in claim 1, wherein said polyisocyanate contains two isocyanate groups.

12. A thermoplastic hot melt composition as claimed in claim 1, wherein said polyisocyanate is 4,4-diphenylmethane diisocyanate.

13. A thermoplastic hot melt composition as claimed in claim 1, wherein said isocyanate contains two isocyanate groups and contains from 6 to 100 carbon atoms.

14. A thermoplastic hot melt composition as claimed in claim 1, wherein said long chain polyol has a number average molecular weight of more than 500 to 5,000.

15. A thermoplastic hot melt composition as claimed in claim 1, wherein said long chain polyol has a number average molecular weight of more than 800 to 300.

16. A thermoplastic hot melt composition as claimed in claim 1, wherein said long chain polyol has an average functionality of 2.2 or below.

17. A thermoplastic hot melt composition as claimed in claim 1, wherein said chain extending agent has a number average molecular weight of from about 52 to less than 500.

18. A thermoplastic hot melt composition as claimed in claim 1, wherein the NCO/OH ratio is about 0.95 to about 1.05.

19. A thermoplastic hot melt composition as claimed in claim 1, wherein the plasticizer comprises from about 20 to about 70% of the total composition weight.

20. A thermoplastic hot melt composition as claimed in claim 1, wherein the plasticizer comprises from about 25 to about 65% of the total composition weight.

21. A thermoplastic hot melt composition as claimed in claim 1, wherein heating is for 2 to 3 hours at a temperature of from 350° F. to about 430° F.

22. The process as claimed in claim 2, wherein said composition is substantially completely cured in situ and then is further heated for at least 3 minutes.

23. The process as claimed in claim 2, wherein said heating is for at least about 2 hours.

24. The process as claimed in claim 2, wherein said thermoplastic hot melt composition will exhibit a viscosity of less than about 50,000 cps at a temperature of about 250° F. to about 450° F.

25. The process as claimed in claim 2, wherein said thermoplastic hot melt composition will exhibit a viscosity of less than about 25,000 cps at a temperature of about 250° F. to about 450° F.

26. The process as claimed in claim 2, wherein said polyisocyanate has a functionality of 2.15 or less.

27. The process as claimed in claim 2, wherein said polyisocyanate has a functionality of 2.0-2.1.

28. The process as claimed in claim 2, wherein said polyisocyanate contains two isocyanate groups.

29. The process as claimed in claim 2, wherein said polyisocyanate is 4,4-diphenylmethane diisocyanate.

30. The process as claimed in claim 2, wherein said isocyanate contains two isocyanate groups and contains from 6 to 100 carbon atoms.

31. The process as claimed in claim 2, wherein said long chain polyol has a number average molecular weight of more than 500 to 5,000.

32. The process as claimed in claim 2, wherein said long chain polyol has a number average molecular weight of more than 800 to 300.

33. The process as claimed in claim 2, wherein said long chain polyol has an average functionality of 2.2 or below.

34. The process as claimed in claim 2, wherein said chain extending agent has a number average molecular weight of from about 52 to less than 500.

35. The process as claimed in claim 2, wherein the NCO/OH ratio is about 0.95 to about 1.05.

36. The process as claimed in claim 2, wherein the plasticizer comprises from about 20 to about 70% of the total composition weight.

37. The process as claimed in claim 2, wherein the plasticizer comprises from about 25 to about 65% of the total composition weight.

38. The process as claimed in claim 2, wherein heating is for 2 to 3 hours at a temperature of from 350° F. to about 430° F.

* * * * *